United States Patent
Koulogianes

(10) Patent No.: US 9,714,740 B2
(45) Date of Patent: Jul. 25, 2017

(54) SYSTEM, METHOD, AND APPARATUS FOR REGULATING THE FLOW OF GAS

(71) Applicant: Instrument Solutions Inc., Lakeland, FL (US)

(72) Inventor: Dean Koulogianes, Lakeland, FL (US)

(73) Assignee: Instrument Solutions Inc., Lakeland, FL (US)

( * ) Notice: Subject to any disclaimer, the term of this patent is extended or adjusted under 35 U.S.C. 154(b) by 90 days.

(21) Appl. No.: 14/723,941

(22) Filed: May 28, 2015

(65) Prior Publication Data

US 2016/0018826 A1 Jan. 21, 2016

Related U.S. Application Data

(60) Provisional application No. 62/026,285, filed on Jul. 18, 2014.

(51) Int. Cl.
  *F17D 1/04*   (2006.01)
  *G05D 7/00*   (2006.01)
  *F17D 3/01*   (2006.01)

(52) U.S. Cl.
  CPC .............. *F17D 1/04* (2013.01); *G05D 7/005* (2013.01); *F17D 3/01* (2013.01); *Y10T 137/2705* (2015.04); *Y10T 137/7795* (2015.04); *Y10T 137/87322* (2015.04)

(58) Field of Classification Search
  CPC .... F17D 1/04; F17D 3/01; G05D 7/05; G05D 7/005; Y10T 137/7795; Y10T 137/2703; Y10T 137/2705; Y10T 137/86558; Y10T 137/87322; Y10T 137/87788

USPC ........ 137/505.12, 87.03, 87.04, 594, 599.08, 137/872

See application file for complete search history.

(56) References Cited

U.S. PATENT DOCUMENTS

| | | | | |
|---|---|---|---|---|
| 2,095,243 | A * | 10/1937 | Diescher | F17D 1/02 137/485 |
| 2,345,520 | A * | 3/1944 | Ziebolz | F23D 14/60 137/486 |
| 2,643,541 | A * | 6/1953 | McCreary | G01N 25/147 137/2 |
| 2,702,591 | A * | 2/1955 | Dickey | F23N 1/00 137/87.04 |
| 2,939,456 | A * | 6/1960 | Fay | A62B 9/022 128/204.27 |

(Continued)

*Primary Examiner* — William McCalister
(74) *Attorney, Agent, or Firm* — Maier & Maier, PLLC

(57) ABSTRACT

Current natural gas measurement and regulation systems are sensitive to loss of electrical power, which can cause brown-outs and curtailment of power in the local area if power systems reliant on natural gas are downstream from the station. A system for regulating the flow of natural gas and for guaranteeing the flow of natural gas from a source to at least one specific flow line even when the system is not provided with electrical power may be described. Such a system may include at least one of each of: a low-pressure regulation system, a high-pressure regulation system, an inlet gas filter, a relief valve, a low select relay, a differential pressure pneumatic relay, a reset relay, a 5-way universal relay, an electromechanically operated valve, a first manual multi-way valve, a second manual multi-way valve, a high calibration valve, a low calibration valve, a filter, and/or a differential pressure measurement system.

18 Claims, 2 Drawing Sheets

(56) References Cited

U.S. PATENT DOCUMENTS

| | | | | | |
|---|---|---|---|---|---|
| 2,957,544 | A | * | 10/1960 | Baker | C10G 5/02 |
| | | | | | 137/457 |
| 2,962,094 | A | * | 11/1960 | Wallace | F23N 1/02 |
| | | | | | 137/87.03 |
| 3,217,749 | A | * | 11/1965 | Greenwald | F16K 11/12 |
| | | | | | 137/595 |
| 3,400,753 | A | * | 9/1968 | Slover | F22B 37/42 |
| | | | | | 137/312 |
| 3,454,044 | A | * | 7/1969 | Mamzic | G05D 16/166 |
| | | | | | 137/594 |
| 3,552,871 | A | * | 1/1971 | Remke | F02C 1/04 |
| | | | | | 137/14 |
| 3,806,026 | A | * | 4/1974 | Trotter | F23N 1/087 |
| | | | | | 137/87.03 |
| 3,917,162 | A | * | 11/1975 | Trotter | F23N 1/085 |
| | | | | | 137/87.03 |
| 3,928,123 | A | * | 12/1975 | Marks | D21C 3/22 |
| | | | | | 137/587 |
| 4,184,505 | A | * | 1/1980 | Kimata | F02M 69/20 |
| | | | | | 137/87.03 |
| 4,616,480 | A | * | 10/1986 | Deutschmann | F02B 37/007 |
| | | | | | 137/87.03 |
| 5,507,309 | A | * | 4/1996 | Dean | G05D 16/0658 |
| | | | | | 137/312 |

* cited by examiner

SYSTEM, METHOD, AND APPARATUS FOR REGULATING THE FLOW OF GAS

PRIORITY CLAIM

This application claims priority to U.S. Provisional Patent Application No. 62/026,285, filed Jul. 18, 2014, the contents of which are herein incorporated by reference.

BACKGROUND

Many providers of natural gas make use of natural gas measurement and regulation (M&R) stations to control and track natural gas usage by other parties in the chain of distribution whenever a custody transfer occurs. At these stations, an electrically-powered flow computer is often used to control the operation of a valve (often a run switch), opening or closing it to provide more or less natural gas flow in response to customer demand. Measurement and regulation stations are often equipped with a photovoltaic power system to provide electrical power to their equipment (generally flow computers, measurement instrumentation, and various actuators), and may be equipped with a battery intended to store a small amount of electrical power to run this equipment during short and routine periods of low insolation (such as during the night or during periodic bouts of cloudy weather). Other measurement and regulation stations are directly provided with electrical power from the grid.

However, under circumstances when power from the grid has been lost or when photovoltaics are unable to provide adequate electrical power for an extended length of time (such as during extended rain, severe cloudiness, or during extreme weather conditions such as a hurricane), M&R stations cannot adequately monitor natural gas usage. As such, they commonly stop the flow of gas through the station entirely. This forces recipients of natural gas that are downstream from the M&R stations, often including distribution utilities and natural gas-fired power plants, to cease operations, something that has in the past caused brown-outs and curtailment of power just when power has been needed the most (i.e. during or after hurricanes).

SUMMARY

An apparatus for regulating the flow of natural gas may be described. Such a system may include at least one of each of: an inlet gas filter connected to a gas inlet, a high-pressure regulation system connected to the inlet gas filter, a relief valve coupled after the high pressure regulation system, a low-pressure regulation system connected to the high pressure regulation system, a reset relay connected to the low-pressure regulation system, an electromechanically operated valve connected to the low-pressure regulation system, a low select relay connected to the electromechanically operated valve and the reset relay, a differential pressure pneumatic relay coupled to the low-pressure regulation system and to the reset relay, a first manual multi-way valve connected to the low-pressure regulation system, a second manual multi-way valve connected to the first multi-way valve, a multi-way universal relay coupled to the circuit between the high-pressure regulation system and the low-pressure regulation system and connected to the second manual multi-way valve; a high calibration valve connected to the differential pressure pneumatic relay, a low calibration valve connected to the differential pressure pneumatic relay, a differential pressure measurement system coupled to the natural gas flow, and a filter connected between the high-calibration valve and the differential pressure measurement system.

According to another exemplary embodiment, a method of regulating the flow of natural gas may be provided. Such a method may include at least one of each of: Obtaining and connecting the components, supplying high pressure natural gas to an inlet gas filter, passing natural gas through a high pressure regulation system, providing natural gas to a low pressure regulation system, providing natural gas to a differential pressure pneumatic relay, powering the reset relay, providing natural gas to an electromechanically operated valve, providing natural gas to a reset relay, selecting the lower of the two pressure signals from the reset relay and the electromechanically operated valve and passing it along to multi-way valve, providing natural gas to a multi-way valve, releasing control gas to the multi-way universal relay thought multi-way valve.

BRIEF DESCRIPTION OF THE FIGURES

Advantages of embodiments of the present invention will be apparent from the following detailed description of the exemplary embodiments. The following detailed description should be considered in conjunction with the accompanying figures.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, a system for regulating the flow of natural gas and for allowing the flow of natural gas from a source through the system and to at least one specific flow line even when the system is not provided with electrical power may be described. Such a system may include at least one of each of: a high-pressure regulation system or a series of high-pressure regulation systems of different types to be placed in series (for example, a 1301G regulator capable of reducing outlet pressure from some arbitrary high pressure to around 200 psig, and a 1301F regulator capable of further reducing outlet pressure to around 80-100 psig), a low-pressure regulator or series thereof, an inlet gas filter, a relief valve, a low select relay, a differential pressure pneumatic relay, a reset relay, a multi-way universal relay, an electromechanically operated valve (e.g. a solenoid valve), and a first manual multi-way valve. Optionally, the system may also include a second manual multi-way valve, a high calibration valve, a low calibration valve, a filter, and/or a differential pressure measurement system. System components may be connected to each other and to system inputs and outputs with tubing appropriate for the pressure and composition of the gas being transported between them; in an exemplary embodiment, ⅜" diameter seamless metal tubing may be used for this purpose.

Figure 1:
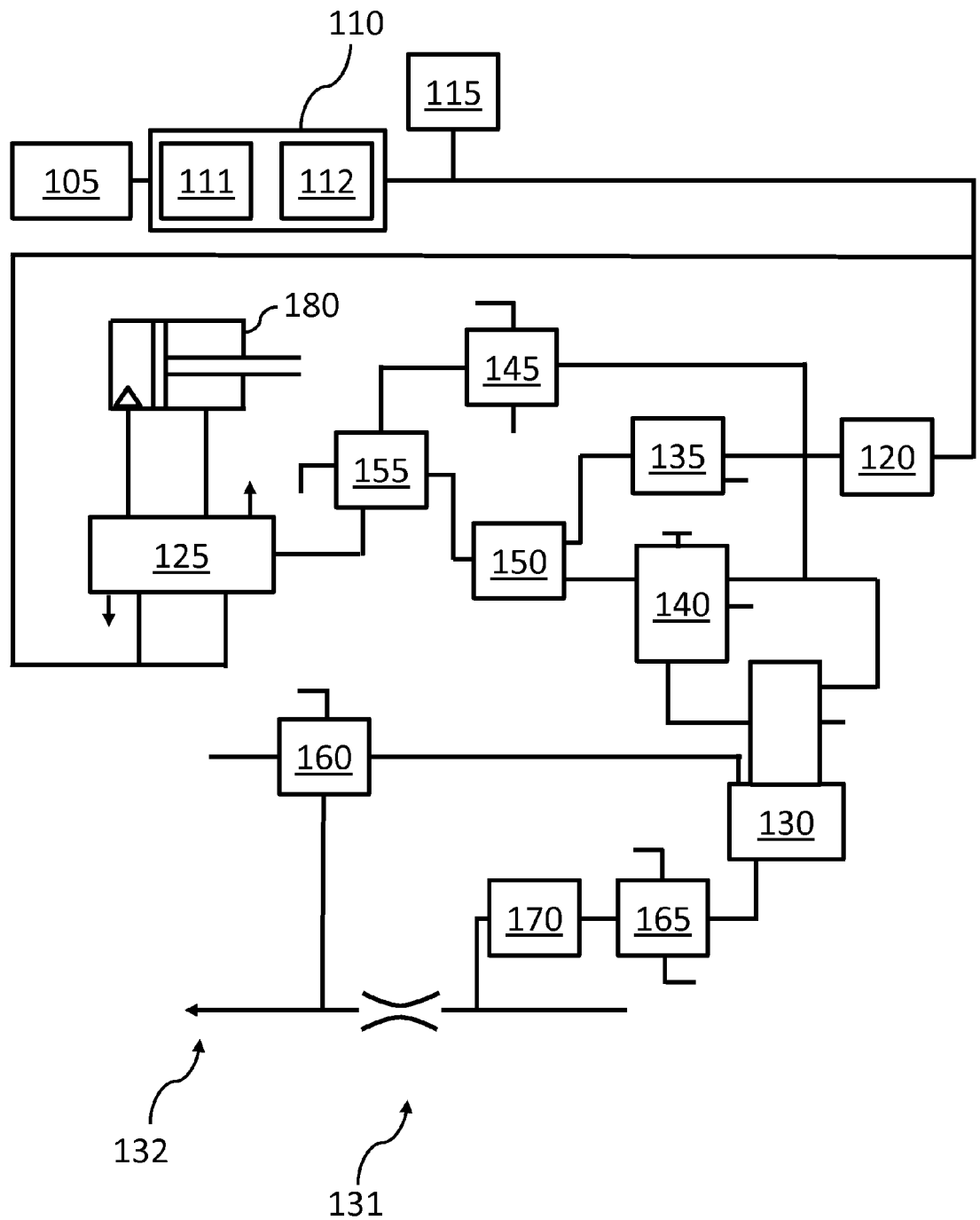
FIG. 1 may display a schematic of one exemplary embodiment of a system for natural gas measurement.

FIG. 1 shows an exemplary schematic of such a system. High pressure natural gas may be supplied to an inlet gas filter 105 and subsequently may pass through a high-pressure regulation system 110 capable of reducing the pressure. In an exemplary embodiment, the high-pressure regulation system may consist of a first pressure regulator 111 (in an exemplary embodiment, a 1301G-type pressure regulator may be used for this purpose) and a second pressure regulator 112 (in an exemplary embodiment, a 1301F-type pressure regulator may be used for this purpose) linked in series. In an exemplary embodiment, gas pressure may be reduced from a maximum pressure input of approximately 1440 psig to approximately 200 psig by the first pressure regulator 111, and further reduced to approximately 100 psig by the second pressure regulator 112; other embodiments may accommodate a higher pressure input or may engage in more or less pressure reduction. Gas then may pass by a relief valve 115 in order to provide overpressure protection to components further downstream; in an exemplary embodiment, the relief valve 115 may be installed at the outlet of the high-pressure regulation system 110 which may be the outlet of second pressure regulator 112 may have a range of potential settings that allow pressure to be relieved from the system at a desirable point, and may be factory set to relieve pressure from the system when pressure at the relief valve 115 reaches a desired pressure. In an exemplary embodiment, this may be approximately 150 psig.

The high-pressure regulation system 110 may provide natural gas at a low pressure to a low-pressure regulation system 120 and a multi-way universal relay 125. The low-pressure regulation system may further reduce the pressure of the natural gas. In the embodiment displayed in the exemplary schematic, the low-pressure regulation system 120 may consist of a single 67CFR low-pressure regulator (in an exemplary embodiment, a 67CFR-type low-pressure regulator may be used for this purpose), which may reduce gas pressure to approximately 35 psig under normal circumstances but which may be field-set to provide more, less, or no pressure regulation (for a maximum pressure of approximately 100 psig).

The low-pressure regulation system 120 in turn may provide gas to a differential pressure pneumatic relay 130, an electromechanically operated valve 135, a reset relay 140, and/or a first multi-way valve 145, either individually or in any combination. The differential pressure pneumatic relay 130 may be set to trigger when the differential gas pressure across a plurality of adjustable set points within the apparatus reaches a certain value; this value also may be adjustable. Measurement of this differential pressure may take place across a flow meter, a flow conditioner, an orifice plate, a valve, or under any other conditions within the system. The threshold value or set point for the differential pressure pneumatic relay 130 to trigger may itself be adjustable; in an exemplary embodiment, this value may be set to be any desired differential pressure between approximately 0.5 psig and approximately 135 psig by a technician or may be field set by the customer, as desired. Alternatively, this value may be fixed, either at a value considered to be appropriate by the manufacturer or at a value specified by the user at or before installation of the differential pressure pneumatic relay 130; using a fixed value in this manner may simplify the design by reducing the number of moving parts. In the exemplary schematic, a differential pressure measurement may be taken at point 131 along the flow of natural gas 132.

Gas passing through the pneumatic relay 130 (hereafter referred to as "control gas") may power the reset relay 140. In an exemplary embodiment, when the control gas may pass through this system, a control (i.e. a switch or pushbutton, or in an exemplary embodiment, a knob) on the reset relay 140 may be pushed away from the body of the reset relay 140, potentially further exposing the control to a user. The reset relay 140 may have multiple settings that cause it to perform different behaviors; for example, the reset relay 140 may have an automatic setting and a manual setting. When in the automatic setting, the reset relay 140 may open and close automatically when stroked with control gas; when in a manual setting, the reset relay 140 may be opened with user input when control gas is present.

Control gas may pass through the reset relay 140 and/or the electromechanically operated valve 135 into a low select relay 150. The low select relay 150 may select and pass along the lower of the two pressure signals from the reset relay 140 and the electromechanically operated valve 135, and thus may only allow control gas to pass by if both the reset relay 140 and the electromechanically operated valve 135 are open and unobstructed. This may ensure that the output of the low select relay 150 may be controlled by either the reset relay 140 or the electromechanically operated valve 135. The low select relay 150 may then output control gas which, if allowed to pass through a second multi-way valve 155, may be used to stroke the multi-way universal relay 125.

The first multi-way valve 145 and the second multi-way valve 155 may be configured to allow or deny the passage of control gas, as desired; the first multi-way valve 145 and the second multi-way valve 155 may also be configured to vent the control gas elsewhere, for example to an external tank, to the rest of the system, to the atmosphere, or to another desired location. In the embodiment displayed in the exemplary schematic, the first multi-way valve 145 may be configured such that when the first multi-way valve 145 is configured in a first position, gas may be allowed to flow between the multi-way universal relay 125 and the second multi-way valve 155 and may be obstructed from flowing to the low select relay 150. When the first multi-way valve 145 is configured in a second position, the vent between the first multi-way valve 145 and the second multi-way valve 155 may be obstructed and control gas may be allowed to pass unobstructed between the low-select relay 150 and the multi-way universal relay 125.

The second multi-way valve 155 may be configured such that when the valve 155 is in a first position, gas that has been vented in the direction of the second multi-way valve 155 from the first multi-way valve 145 may be vented elsewhere, for example to an external tank or to the atmosphere. When the second valve 155 is in a second position, control gas may be directed between the low-pressure regulation system 120 and the first multi-way valve 145; if the first multi-way valve 145 is in the first position such that gas is allowed to flow between the multi-way universal relay 125 and the second multi-way valve 155, control gas may be supplied directly to the multi-way universal relay 125 via this channel. Both the first multi-way valve 145 and the second multi-way valve 155 may be manually adjustable, may be triggered automatically in response to some stimulus, or some combination of the two. The first multi-way valve 145 and the second multi-way valve 155 may be adjustable to a variety of positions or to only those previously described.

The multi-way universal relay 125 may exhibit different behaviors when supplied with control gas from the second multi-way valve 155 and when no gas is supplied. Power gas is defined hereafter as the gas used to power the actuator 180. In one potential embodiment, the multi-way universal relay 125 may have two output ports for power gas, a first port and a second port. When the multi-way universal relay 125 is stroked with control gas, the first port may be toggled or held closed and the second port may be toggled or held open, obstructing the flow of power gas from the first port and allowing it to flow from the second port. When the control gas is removed, the open and closed ports may be switched, allowing power gas to flow from the first port and obstructing its flow from the second port.

The electromechanically operated valve 135 may be a solenoid valve or another type of valve that may be electromagnetically actuated. In an exemplary embodiment, the electromechanically operated valve 135 (in an exemplary embodiment, a 24-volt DC solenoid coil may be used for this purpose) may be operationally connected to a field power source connected to the system. When power is provided to the valve 135, it may cycle an actuator, resulting in changes to the gas flow of the system; when power is removed, the actuator may be restored to its original state. Other embodiments may use solenoids with different characteristics; for example, a solenoid with different voltage requirements may be employed.

A low calibration valve 160 and high calibration valve 165 may be used to configure the pneumatic relay differential pressure measurement system 131. The low calibration valve 160 may be set to a low pressure by, for example, opening it to the atmosphere. The high calibration valve 165 may be set to a high pressure by, for example, applying an external pressure source known to be capable of generating a pressure equal to or higher than the pressure differential desired. One exemplary embodiment of this system, as displayed in exemplary FIG. 1, may be constructed with the assumption that an external pressure source may be used, and a filter 170, such as but not limited to a 7-micron filter, may be incorporated to filter out larger particulates that could contaminate the flow of natural gas through the system. A filter of an alternate size may be used if desired, as may no filter at all.

A user may adjust the point at which the pneumatic relay 130 may trip by applying the pressure source to the high calibration valve 165 and slowly increasing pressure until the differential pressure read by the differential pressure measurement system 131 has reached the desired set point; in the embodiment displayed in the exemplary schematic, a user may observe whether or not the differential pressure has reached the desired set point by observing the state of a control on the reset relay 140. If the set point is not at the proper position, it may be adjusted by mechanically adjusting the pneumatic relay 130; in one exemplary embodiment, the top of the pneumatic relay device 130 may contain an exposed lock nut which may be adjusted in one direction to lower the pressure of the set point and adjusted in the other direction to raise the pressure of the set point.

The differential pressure represented by this set point may be reached during normal use of the system, this pressure differential may be measured by the differential pressure measurement system 131. This may trip the pneumatic relay 130 and in turn cause the reset relay 140 to lock in the appropriate position. This may create a low-pressure signal to be passed to the low-select relay 150 even if the electromechanically operated valve 135 is open, which may change the state of the multi-way universal relay 125 and activate actuator 180.

Figure 2:
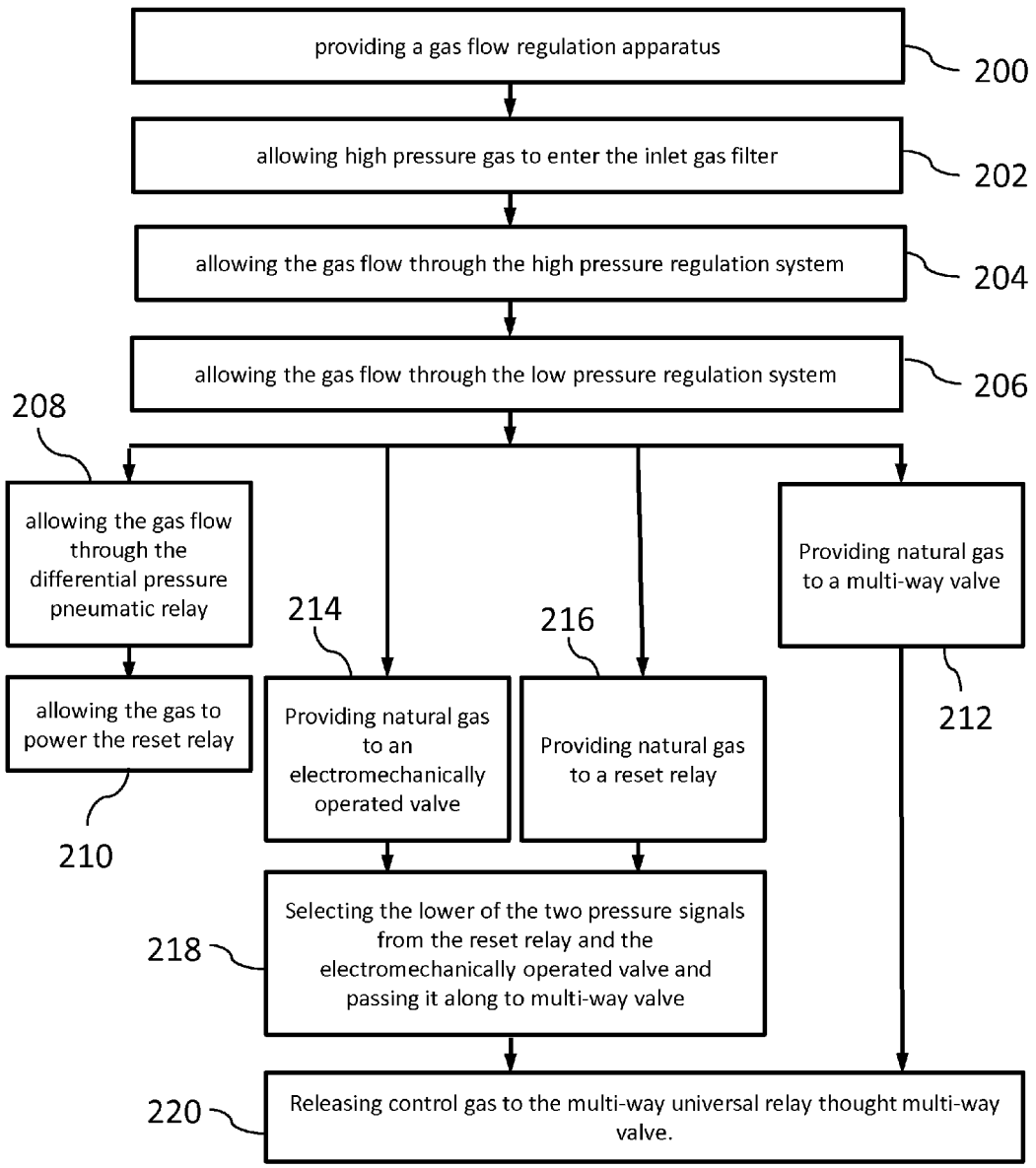
FIG. 2 may display a schematic of one exemplary embodiment of a method for natural gas measurement.

In an additional exemplary embodiment detailed in FIG. 2 a method of regulating the flow of natural gas when the system is not provided with electricity may be described. The first step may be to provide a gas flow regulation apparatus 200. Then the operator may start by supplying high pressure natural gas to the inlet gas filter 202. The gas flow may be allowed through the high pressure regulation system 204 to reduce its pressure and thus allowing the gas flow through a low-pressure regulation system 206. The operator may then allow the gas flow to a differential pressure pneumatic relay 208 that may allow the gas to power the reset relay 210. The low pressure regulation system may also provide natural gas to an electromechanically operated valve 214. Concurrently, natural gas may be provided to a reset relay 216. The low select relay may measure the lower of the two pressure signals from the reset relay and the electromechanically operated valve and may pass it along to multi-way valve 218. Finally, the operator may activate the multi-way valve 212 and output control gas to the multi-way universal relay 220. That, in turn, may control the actuator regulating the gas flow.

The foregoing description and accompanying figures illustrate the principles, exemplary embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A gas flow regulating apparatus comprising a series of components disposed along a gas flow path, the components comprising:
   a gas inlet;
   an inlet gas filter communicatively coupled to the gas inlet;
   a high-pressure regulation system connected to the inlet gas filter;
   a relief valve coupled to the gas flow downstream of the high pressure regulation system;
   a low-pressure regulation system following the high pressure regulation system;
   a reset relay connected to the low-pressure regulation system;
   an electromechanically operated valve connected to the low-pressure regulation system;
   a low select relay connected to the electromechanically operated valve and the reset relay;
   a differential pressure pneumatic relay coupled in parallel to the low-pressure regulation system and to the reset relay;
   a first manual multi-way valve connected to the low-pressure regulation system;
   a second manual multi-way valve connected to the first manual multi-way valve;

a multi-way universal relay coupled to the gas flow path between the high-pressure regulation system and the low-pressure regulation system and connected to the second manual multi-way valve;

a high calibration valve connected to the differential pressure pneumatic relay;

a low calibration valve connected to the differential pressure pneumatic relay;

a differential pressure measurement system coupled to the gas flow path; and a filter connected between the high calibration valve and the differential pressure measurement system.

2. The apparatus of claim 1 wherein the relief valve is installed at the outlet of the high-pressure regulation system, and relieves pressure from the system when pressure at the relief valve reaches 150 psig.

3. The apparatus of claim, wherein the electromechanically operated valve is a 24-volt DC solenoid coil.

4. The apparatus of claim 1, wherein the reset relay has an automatic setting and a manual setting.

5. The apparatus of claim 1, wherein the high-pressure regulation system further comprises at least two pressure regulators linked in series.

6. The apparatus of claim 5 wherein a first pressure regulator of the at least two pressure regulators reduces the pressure from a maximum pressure input of 1440 psig to 200 psig, and a second pressure regulator of the at least two pressure regulators further reduces the pressure to 90 psig.

7. The apparatus of claim 1 wherein the differential pressure pneumatic relay is set to trigger when a differential gas pressure reaches a predetermined value across a plurality of adjustable set points.

8. The apparatus of claim 7 wherein measurement of the differential gas pressure takes place across at least one of a flow meter, a flow conditioner, an orifice plate, or a valve within the apparatus.

9. The apparatus of claim 7 wherein the predetermined value for the differential pressure pneumatic relay to trigger is between 0.5 psig and 135 psig.

10. A method of regulating a flow of gas comprising the steps of:
providing a gas flow regulation apparatus comprising:
an inlet gas filter communicatively coupled in series with a gas inlet by a tube,
a high-pressure regulation system connected to the inlet gas filter,
a relief valve coupled to the circuit after the high pressure regulation system,
a low-pressure regulation system connected to the high pressure regulation system by a tube,
a reset relay connected to the low-pressure regulation system,
an electromechanically operated valve connected to the low-pressure regulation system,
a low select relay connected to the electromechanically operated valve and the reset relay,
a differential pressure pneumatic relay coupled to the low-pressure regulation system and to the reset relay,
a first manual multi-way valve connected to the low-pressure regulation system,
a second manual multi-way valve connected to the first multi-way valve,
a multi-way universal relay coupled to the circuit between the high-pressure regulation system and the low-pressure regulation system and connected to the second manual multi-way valve,
a high calibration valve connected to the differential pressure pneumatic relay,
a low calibration valve connected to the differential pressure pneumatic relay,
a differential pressure measurement system coupled to the natural gas flow, and
a filter connected between the high calibration valve and the differential pressure measurement system;
allowing high pressure gas to enter the inlet gas filter;
allowing the gas flow through the high pressure regulation system;
allowing the gas flow through the low pressure regulation system;
allowing the gas flow through the differential pressure pneumatic relay;
allowing the gas to power the reset relay;
providing gas flow to the electromechanically operated valve;
providing gas flow to the reset relay;
allowing the low select relay to select the lower of the two pressure signals from the reset relay and the electromechanically operated valve and pass the gas flow along to the first manual multi-way valve;
providing gas flow to the second manual multi-way valve; and
releasing the gas flow to the multi-way universal relay through the multi-way valve.

11. The method of claim 10 wherein the relief valve is installed at the outlet of the high-pressure regulation system, and relieves pressure from the system when pressure at the relief valve reaches 150 psig.

12. The method of claim 10 wherein in the electromechanically operated valve is a 24-volt DC solenoid coil.

13. The method of claim 10 wherein the reset relay has an automatic setting and a manual setting.

14. The method of claim 10, the high-pressure regulation system further comprising at least two pressure regulators linked in series.

15. The method of claim 14 wherein the first pressure regulator reduces the pressure from a maximum pressure input of 1440 psig to a pressure input of 200 psig, and the second pressure regulator further reduces the pressure to 90 psig.

16. The method of claim 10 wherein the differential pressure pneumatic relay is set to trigger when a differential gas pressure reaches a predetermined value across a plurality of adjustable set points.

17. The method of claim 16 wherein measurement of the differential gas pressure takes place across at least one of a flow meter, a flow conditioner, an orifice plate, or a valve within the apparatus.

18. The method of claim 16 wherein the predetermined value for the differential pressure pneumatic relay to trigger is between 0.5 psig and 135 psig.

* * * * *